(12) United States Patent
Dees et al.

(10) Patent No.: US 9,867,221 B2
(45) Date of Patent: Jan. 9, 2018

(54) PAIRING BETWEEN WIRELESS DEVICES

(75) Inventors: Walter Dees, Eindhoven (NL);
Johannes Arnoldus Cornelis Bernsen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 26 days.

(21) Appl. No.: 14/003,821

(22) PCT Filed: Mar. 9, 2012

(86) PCT No.: PCT/IB2012/051107
§ 371 (c)(1),
(2), (4) Date: Sep. 9, 2013

(87) PCT Pub. No.: WO2012/123868
PCT Pub. Date: Sep. 20, 2012

(65) Prior Publication Data
US 2013/0344812 A1 Dec. 26, 2013

(30) Foreign Application Priority Data
Mar. 16, 2011 (EP) .................... 11305292

(51) Int. Cl.
*H04B 7/00* (2006.01)
*H04W 76/02* (2009.01)
(Continued)

(52) U.S. Cl.
CPC ........... *H04W 76/023* (2013.01); *H04L 63/18* (2013.01); *H04W 12/04* (2013.01);
(Continued)

(58) Field of Classification Search
CPC .......... H04Q 11/0062; H04Q 11/0066; H04W 76/023; H04W 28/18; H04W 48/02; H04W 64/003; H04W 72/08; H04W 80/00
(Continued)

(56) References Cited

U.S. PATENT DOCUMENTS 7,860,456 B2 12/2010 Kim
8,200,868 B1 * 6/2012 't Hooft .............. H04M 1/7253
710/1
(Continued)

FOREIGN PATENT DOCUMENTS

WO WO02089411 A2 11/2002
WO WO03053048 A1 6/2003
(Continued)

OTHER PUBLICATIONS

Ludovic Rousseau et al., "A Trusted Device to Secure a Bluetooth Piconet", Published in Proc. of Gemplus Developer Conference, Paris, France, Jun. 20-21, 2001, Gemplus, B.P. 100, 13881 Gemenos cedex, France.
(Continued)

*Primary Examiner* — Ajibola Akinyemi
(74) *Attorney, Agent, or Firm* — Larry Liberchuk

(57) ABSTRACT

The present invention relates to a method for enabling a wireless communication between at least one peripheral unit (a1-aN) and a device (100), the at least one peripheral unit (a1-aN) being arranged for communicating with a pairing system (10) according to first wireless communication type, the device (100) being arranged for communicating with the pairing system (10) according to a second communication type, the method comprising the following steps: —the pairing system (10) configuring a main communication unit (11) adapted to communicate according to the first wireless
(Continued)

communication type; —pairing the at least one peripheral unit (a1-aN) with the main communication unit (11); —the pairing system (10) sending to the device (100) the pairing information suitable for communicating with the at least one peripheral unit (a1-aN); —the device (100) configuring a first communication unit (101) adapted to communicate with the at least one peripheral unit (a1-aN) according to the first wireless communication type, using the pairing information received from the pairing system (10).

15 Claims, 1 Drawing Sheet

(51) Int. Cl.
H04W 12/04 (2009.01)
H04L 29/06 (2006.01)
H04W 12/06 (2009.01)
H04W 88/06 (2009.01)

(52) U.S. Cl.
CPC .. G06F 2213/0038 (2013.01); H04L 63/0869 (2013.01); H04W 12/06 (2013.01); H04W 88/06 (2013.01)

(58) Field of Classification Search
USPC .......................................................... 455/41.2
See application file for complete search history.

(56) References Cited

U.S. PATENT DOCUMENTS

| 8,462,734 | B2* | 6/2013 | Laine | H04M 1/7253 |
| | | | | 370/252 |
| 2008/0134281 | A1 | 6/2008 | Shinde | |
| 2008/0175379 | A1 | 7/2008 | Hansen | |
| 2008/0227393 | A1* | 9/2008 | Tang | H04W 8/005 |
| | | | | 455/41.3 |
| 2008/0269927 | A1* | 10/2008 | Szolyga | G06F 1/1632 |
| | | | | 700/94 |
| 2008/0320587 | A1 | 12/2008 | Vauclair | |
| 2009/0170521 | A1 | 7/2009 | Dubs | |
| 2010/0057969 | A1* | 3/2010 | Meiri | G06F 1/1632 |
| | | | | 710/303 |
| 2012/0099566 | A1* | 4/2012 | Laine | H04M 1/7253 |
| | | | | 370/338 |
| 2013/0173374 | A1* | 7/2013 | Weiss | G06Q 30/02 |
| | | | | 705/14.27 |

FOREIGN PATENT DOCUMENTS

WO WO2009027770 A1 3/2009
WO WO2010117854 A1 10/2010

OTHER PUBLICATIONS

"Using Bluetooth Securely", MindfulSecurity, The Awareness Resource, Oct. 26, 2009, pp. 1-5 http://mindfulsecurity.com/2009/10/26/using-bluetooth-securely/.
Lewis James, "Bluetooth Security" ECE 578, Mar. 7, 2005.
Vainio, J.T., "Bluetooth Security", Department of Computer Science and Engineering, Helsinki University of Technology, May 25, 2000, http://www.iki.fi/jiitv/bluesec.pdf.
Bluetooth, "Simple Pairing Whitepaper", Core Specification Working group, Aug. 3, 2006, http://web.archive.org/web/20061018032605/http://www.bluetooth.com/NR/rdonlyres/0A0B3F36-D15F-4470-85A6-F2CCFA26F70F/0/SimplePairing_WP_V10r00.pdf.
"Specification of the Bluetooth System", Master Table of Contents & Compliance Requirements, vol. 2, Part H, section 3.1—Key Types; vol. 2, part H Section 3.2.7 Modifying the Link Keys; vol. 2, part H, section 7—List of Figures; vol. 2, Part F Section 4.3—Change Connection Link Key, Nov. 5, 2003.

* cited by examiner

PAIRING BETWEEN WIRELESS DEVICES

The present invention relates to wireless home networks, and more particularly to methods for enabling a wireless communication between at least one peripheral unit and a device.

This invention is, for example, relevant for Bluetooth wireless network.

The document WO03/053048A1 discloses a system comprising devices which are interconnected wirelessly. This system may form a docking environment adapted to communicate with portable devices, such as Personal Digital Assistants PDAs, Smartphones, laptops, etc. Suitable technologies for wireless communication between all this kinds of devices are for instance Wi-Fi or Bluetooth or the like. Although the communication is wireless, the devices are not able to communicate unless they are paired. A pairing step is required to set up a secure connection. Once the initial pairing between two devices has been performed, further pairing between these two devices may occur in an automatic way.

There are various possibilities for pairing devices. For instance, in conventional Bluetooth core specifications for Bluetooth versions prior to V2.1, pairing of Bluetooth devices may require the user to enter a Personal Identification Number PIN code if he wants a secure pairing between the devices. One of the devices plays the role of the master unit, and the other devices play the role of slave units, the whole devices forming a piconet.

In Bluetooth V2.1, another pairing scheme called Secure Simple Pairing is added. There are four basic variants of Secure Simple Pairing. The first two require user action ('Passkey Compare' and 'Passkey Entry'). The next one, 'Simply Works', does not require user interaction, but it does not offer protection against so-called Man-in-the-Middle-Attacks. The remaining one, 'Out of Band', may involve some user interaction, such as moving one device close to the other device in case Near Field Communication (NFC) is used.

A drawback is that a portable device must pair to one single peripheral unit at a time. Furthermore, the portable device has to perform the pairing protocol available for each single peripheral unit, some of them requiring different user interaction.

The aim of the invention is to solve at least one of the above-mentioned drawbacks.

It is an object of the invention to provide a method for enabling a wireless communication between at least one peripheral unit and a device.

This object is achieved in a method in which the at least one peripheral unit is arranged for communicating with a pairing system according to a first wireless communication type, in which the device is arranged for communicating with the pairing system according to a second communication type. The method according to the invention comprises the following steps:

the pairing system configuring a main communication unit adapted to communicate according to the first wireless communication type;
  pairing the at least one peripheral unit with the main communication unit;
  the pairing system sending to the device the pairing information suitable for communicating with the at least one peripheral unit;
  the device configuring a secondary communication unit adapted to communicate with the at least one peripheral unit according to the first wireless communication type, using the pairing information received from the pairing system.

The method has the advantage of making the peripheral units available for communicating with the secondary communication unit of the device in a convenient way for a user. The peripheral units need to be paired with the pairing system only once. When the pairing system is part of a docking station, the action of docking the device (for instance a portable device) to the docking station will make the device to become what is called a docked device. This action of docking, using a second communication type, comprises or will trigger the transfer of pairing information from the docking station to the device to be docked or the docked device, so that the docked device will be able to communicate with the peripheral units, using the first communication type, and without the need to pair the docked device with each of the peripheral units. Another advantage is that the first communication type between the secondary communication unit of the docked device and the peripheral units may be independent of the second communication type between the docked device and the docking station, and may keep the bandwidth of the second communication type available for other applications.

According to one embodiment of the invention, the pairing information may be sent via a third communication type. The third communication type may comprise an out-of-band communication type, for example a Near Field Communication type between the docking station and the device to be docked or the docked device. The third communication type has the advantage of improving the security level when the pairing information is sent from the docking station to the device.

According to one embodiment of the invention, the main communication unit of the docking station stops communicating with the peripheral units, so that the secondary communication unit of the docked device becomes the only communication unit of the first wireless communication type.

According to one embodiment of the invention, the docked device sends an acknowledgement message to the docking station upon reception of the pairing information. Once the secondary communication unit of the docked device is able to communicate with the peripheral units, the docked device sends this message to the docking station, so that the docking station controls the main communication unit to stop communicating with the peripheral units.

According to one embodiment of the invention, the main communication unit of the docking station takes over the first wireless communication type with the peripheral units upon detection by the docking station that the secondary communication unit of the docked device stops to communicate with the peripheral units. Also, the main communication unit of the docking station takes over the first wireless communication type with the peripheral units upon a disconnection event between the docking station and the docked device.

According to one embodiment of the invention, the method further comprises the docking station sending the pairing information to a docked device that is registered on a list. The docking station is adapted to register identification data of devices in a memory module. The registration may occur in an automatic way, or may require user interaction.

According to one embodiment of the invention, the method further comprises the docking station renewing the encryption keys between the main communication unit and the peripheral units. This step of renewing may be performed at any time between the disconnection (the "undocking event") of one docked device, and the connection (the "docking event") of a further docked device. This embodiment has the advantage of improving the security of the first communication type whatever the number of docked devices comprising a secondary communication unit that may be able to communicate with the peripheral units.

The step of renewing the encryption keys may also include determining the minimum communication signal strength value of the first wireless communication type between the main communication unit of the docking station and each peripheral unit. Then the main communication unit and/or each peripheral unit are able to communicate using the determined signal strength value appropriate for each peripheral unit. This further increases the security level when renewing the encryption keys since it reduces the range in which a previous docked device can overhear the first communication type. A previous docked device, which is no longer in the docking environment, will then not able to listen to the communication between the peripheral units and another docked device, and will then not be able to update the encryption keys of its own secondary communication unit.

According to one embodiment of the invention, the first wireless communication type comprises Bluetooth communication standards.

According to one embodiment of the invention the second communication type comprises Wi-Fi communication standards, and more particularly Wi-Fi peer-to-peer (P2P) communication type standards, also known as Wi-Fi DIRECT.

These and other aspects of the invention will be apparent from and will be elucidated with reference to the embodiments described hereinafter.

The present invention will now be described in more detail, by way of examples, with reference to the accompanying drawings, wherein.

Figure 1:
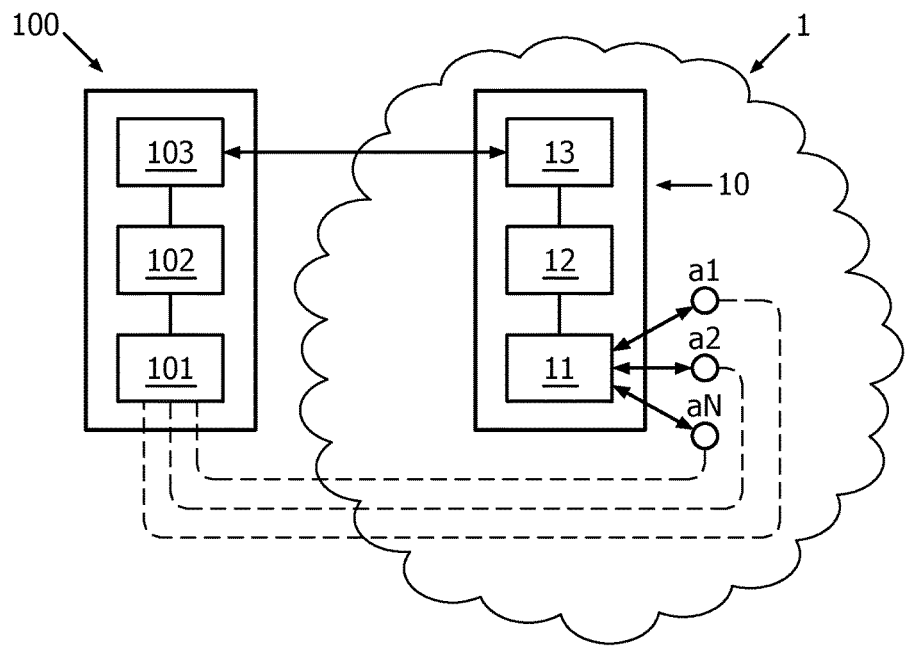
FIG. 1 is a schematic drawing of a network with peripheral units, a docking station and a docked device.
Figure 2:
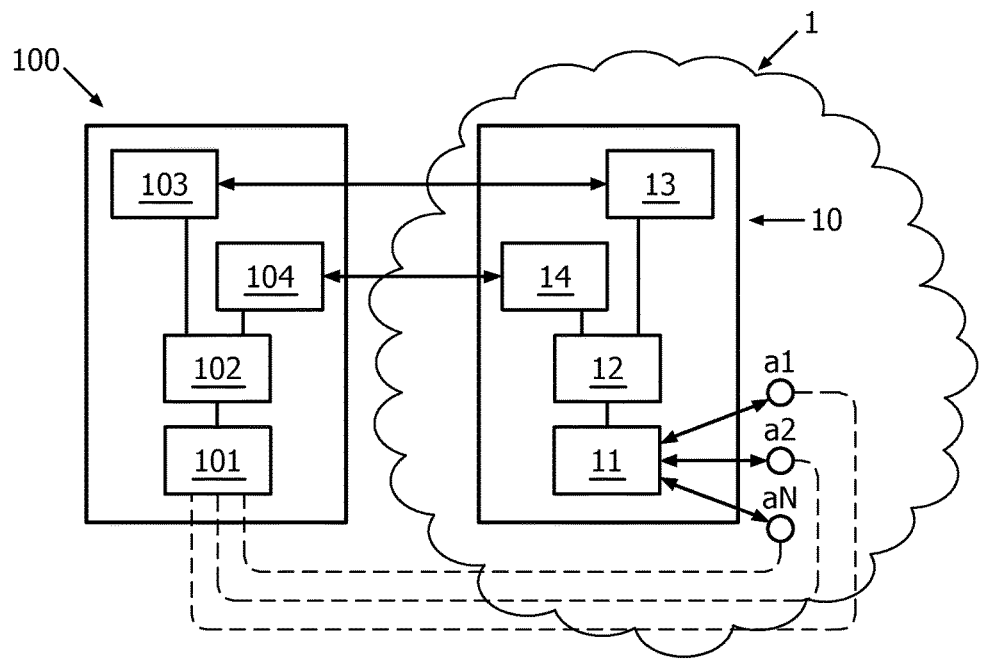
FIG. 2 is a schematic drawing of the network of FIG. 1, further comprising a third communication type between the docking station and the docked device.

In FIGS. 1 and 2, the peripheral units are depicted under the reference a1, a2, to aN. The peripheral units may comprise devices like mouse, keyboard, television set, DVD player, loudspeakers, etc. According to one embodiment of the invention, the first wireless communication type comprises the Bluetooth technology; all these peripheral units may use an existing version of the Bluetooth protocols, in which case the peripheral units become the Bluetooth slaves of a Bluetooth piconet.

The wireless docking station 10 may be a specific and dedicated station, or it may be implemented as an application or software in any other device, e.g. a PC, access point, media player, TV, PC monitor, in-car entertainment system, patient health monitoring system, body area sensor network, etc.

The docking station 10 comprises a radio module (not shown), for example a software-radio based system with a single transmitter/receiver section. In one embodiment of the invention, the docking station 10 comprise a pairing system, in which case the radio module comprises a main communication unit 11 for pairing with the peripheral units a1-aN. In one embodiment, the main communication unit 11 is a main Bluetooth master for pairing with the Bluetooth slaves a1-aN. The main Bluetooth master 11 preferably comprises the existing pairing protocols of all Bluetooth versions till V4.0 for pairing with the corresponding Bluetooth slaves a1-aN. The main Bluetooth master 11 and the Bluetooth slaves form the Bluetooth piconet.

The docking station 10 also comprises a docking communication module 13 being arranged for communicating according to a second communication type, for example one of the IEEE 802.11 Wi-Fi standards and more particularly Wi-Fi peer-to-peer (P2P) communication standards, also known as Wi-Fi DIRECT. The docking station 10 may also comprise a docking controller module 12 for controlling the operations of the main Bluetooth master 11 and docking Wi-Fi module 13. The main Bluetooth master 11 may not be necessarily part of the docking station 10. In one example, the pairing system which implements the Bluetooth master 11 may be a separate device (or a separate application or software implemented in any other device) different from the docking station 10. Then, both docking station 10 and pairing system comprise additional communication modules for enabling their own communication type, so that the docking controller module 12 of the docking station 10 is able to communicate with the pairing system and to recover the Bluetooth pairing information. The said communication type between the docking station 10 and the pairing system are the ones that a person skilled in the art is able to design.

The docking station 10 and the peripheral units a1-aN form at least part of a wireless docking environment 1 for a device 100. And the wireless docking station plays the role of a wireless docking host for the device 100.

The device 100 may be one of the devices, portable or not, like mobile phones, tablet computers, digital video or still cameras, portable audio devices, etc. These devices form a kind of devices called "dockee", that is to say a device which is able to dock with the docking station 10. Such devices comprise "dockee elements" for enabling communication with the above-mentioned "docking elements" of the docking station 10. In one embodiment according to the invention, the device 100 comprises a secondary Bluetooth master 101 for communicating with the Bluetooth slaves a1-aN. The device 100 comprises a radio module (not shown), for example a software-radio based system with a single transmitter/receiver section. The radio module comprises the secondary Bluetooth master 101.

The device 100 also comprises a communication module 103, for example a dockee Wi-Fi module 103, arranged for communicating with the docking Wi-Fi module 13 of the docking station 10. The device 100 may also comprise a dockee controller module 102 for controlling the operations of the secondary Bluetooth master 101 and the dockee Wi-Fi module 103.

In the wireless docking environment 1, the docking station 10 makes the Bluetooth slaves a1-aN available to connect to another Bluetooth master of a device in a more convenient manner. To do this, in a preliminary step of the method according to the invention, the Bluetooth slaves a1-aN are paired with the main Bluetooth master 11 of the docking station 10, using the Bluetooth pairing protocol that each Bluetooth slaves a1-aN supports, for example via user interaction. The main Bluetooth master 11 of the docking station 10 thereby contains the Bluetooth slaves pairing information such as the links keys and the Bluetooth addresses of each Bluetooth slave.

Then, when the device 100 enters the wireless docking environment 1 and happens to be in reach and listening, it starts communicating with the docking station 10, using the second communication type, which in one embodiment comprises IEEE 802.11 Wi-Fi standards, and more particularly Wi-Fi DIRECT. The pairing of the wireless device 100 to the docking station 10 will produce a "successful docking" event and the device 100 becomes a docked device.

Once the Wi-Fi connection is established, the docking station 10 is able to send the Bluetooth pairing information to the docked device 100. The Bluetooth pairing information contains the data suitable for communicating with the Bluetooth slaves a1-aN. These data comprises the above-mentioned Bluetooth slaves pairing information, and also the main Bluetooth master pairing information, such as the Bluetooth address, the current channel frequency and the frequency hopping pattern.

In one embodiment according to the invention, the docking station 10 identifies the device 100, in order to determine if the device is what is called a trusted device or not. In one example, the docking station 10 comprises a list of predetermined devices which are allowed to receive the Bluetooth pairing information, and may send the Bluetooth pairing information to the docked device 100 upon registration on said list. This list may be recorded in a memory module of the docking station 10. In another embodiment, the connection of the device 100 to the docking station 10 requires a user interaction for enabling the Wi-Fi communication according to the Wi-Fi pairing protocols available.

The Bluetooth pairing information is sent according to a secured communication type. In one embodiment of the invention, the second communication type implements a securely set-up encrypted Wi-Fi connection. The docking controller module 12 of the docking station 10 recovers the Bluetooth pairing information registered in the main Bluetooth master 11, and then transfers the Bluetooth pairing information to the docking Wi-Fi module 13 to the attention of the docked device 100.

According to another embodiment of the invention which refers to FIG. 2, the secured communication type implements a third communication type. The third communication type preferably comprises an out-of-band communication type in order to improve the security level of the Bluetooth pairing information transfer. In one example, the third communication type uses a Near Field Communication (NFC) between the docking station 10 and the docked device 100. Therefore, the docked device 100 comprises a dockee NFC module 104. The dockee controller module 102 is also designed for controlling the operations of the dockee NFC module 104. In the same way, the docking station 10 comprises a docking NFC module 14. And the docking controller module 12 is also designed for controlling the operation of the docking NFC module 14. The docking controller module 12 recovers the Bluetooth pairing information registered in the main Bluetooth master 11, and then transfers the Bluetooth pairing information to the docking NFC module 14 to the attention of the docked device 100, which Bluetooth pairing information is received by the dockee NFC module 104 when it is brought in proximity of the docking NFC module 14. The invention is not limited to Near Field Communication and other out-of-band communication type may be used.

Although the sending of the pairing information has been described for the docked device 100, it may be also possible to establish the second communication type and the sending of the pairing information at the same time. For example, NFC may be used during an authentication step when the device 100 is connecting to the docking station 10 according to the second communication type, and sending the pairing information may occur during this authentication step.

Upon reception of the Bluetooth pairing information sent by the docking station 10, the docked device 100 configures the secondary Bluetooth master 101 so as to be able to communicate with the Bluetooth slaves a1-aN. The dockee controller module 102 receives the Bluetooth pairing information from the dockee Wi-Fi module 103 (or from the dockee NFC module 104), and then configures the secondary Bluetooth master 101 so as be identical to the main Bluetooth master 11 of the docking station 10. Therefore the secondary Bluetooth master 101 of the docked device 100 is able to communicate directly (depicted by the dotted lines on FIGS. 1 and 2) with the Bluetooth slaves, instead of the main Bluetooth master 11 of the docking station 10.

In one embodiment of the invention, the method comprises the docked device 100 sending an acknowledgement message to the docking station 10 upon reception of said Bluetooth pairing information. The acknowledgement message may be sent via the Wi-Fi channel or the NFC channel. Upon reception of the acknowledgement message by the docking station 10, the docking controller module 12 makes the main Bluetooth master 11 stopping to communicate with the Bluetooth slaves a1-aN, so that there is only one Bluetooth master communicating with the Bluetooth slaves at a time.

Then, upon detection that the secondary Bluetooth master 101 of the docked device 100 stops to communicate with the Bluetooth slaves a1-aN, the main Bluetooth master 11 of the docking station 10 takes over the Bluetooth communication type with the Bluetooth slaves a1-aN. Furthermore, when the docked device 100 disconnects from the docking station 10, the disconnection event ("undocking" event) triggers the docking controller module 12 to make the main Bluetooth master 11 taking over the Bluetooth communication type with the Bluetooth slaves a1-aN.

The invention is not limited to enable a connection between only one docked device 100 and the Bluetooth slaves a1-aN. Other devices may also enter the wireless docking environment 1. The docking station 10 is adapted to send the Bluetooth pairing information to one docked device at a time, meaning that the docking station 10 will send the Bluetooth paring information for example if there is no other Bluetooth master of a docked device which is communicating with the Bluetooth slaves a1-aN.

In one embodiment of the invention, the method comprises the docking station 10 renewing the encryption keys between the main Bluetooth master 11 and the Bluetooth slaves a1-aN, for example after an undocking event. This step may also be done upon pairing of a further device (not shown) with the docking station 10 via the Wi-Fi channel.

For example, Bluetooth standards provide a method for renewing the encryption keys without requiring user interaction, by using the mechanism as described in Bluetooth 2.0 specification Part F Section 4.3 CHANGE CONNECTION LINK KEY, and part H Section 3.2.7 MODIFYING THE LINK KEYS. Renewing the encryption keys before another docking of a device with the docking station 10 has the advantage of improving the security level, and to avoid that a previous docked device may be able to listen to the Bluetooth communication type between the Bluetooth slaves a1-aN and another docked device.

Furthermore, the step of renewing the encryption keys may include determining the minimum communication signal strength value of the Bluetooth communication between the main Bluetooth master 11 and each Bluetooth slave a1-aN. Then the step of renewing the encryption keys includes the main Bluetooth master 11 and/or each Bluetooth slave a1-aN communicating by using the determined signal strength value appropriate for each Bluetooth slave a1-aN. During the re-keying procedure for each Bluetooth slave, the main Bluetooth master 11 starts the procedure with a signal strength too low for communicating with the Bluetooth slave, the signal strength gradually increasing until the main Bluetooth master 11 has gotten a positive response (e.g. LMP_sres) from the given Bluetooth slave. Before starting the renewing the encryption key between the main Bluetooth master 11 and a Bluetooth slave a1-aN, the main Bluetooth master 11 may send a Bluetooth message ("LMP_supervision_timeout") to the Bluetooth slave with an increased timeout value sufficient to perform the step of re-keying.

In one embodiment of the invention, the pairing system configures a first and second main Bluetooth masters (not shown). In this embodiment, Bluetooth slaves are the one which are able to pair with multiple Bluetooth masters (like Bluetooth headsets for example). The pairing procedure of Bluetooth slaves is then performed twice, i.e. with each main Bluetooth master, as above-mentioned. Therefore the pairing system contains two different pairing information clusters. After the identification step of the device 100 above-mentioned, the docking station 10 may send one cluster of pairing information if the device 100 is a trusted device, and may send the other cluster of pairing information if the device 100 is not a trusted device. This embodiment has the advantage of improving the security of the Bluetooth communication between the trusted devices and the Bluetooth slaves, because the non-trusted devices (also called guest devices) will not be able to listen to the said communication which requires at least different link keys.

While the invention has been illustrated and described in detail in the drawings and foregoing description, such illustration and description are to be considered illustrative or exemplary and not restrictive; the invention is not limited to the disclosed embodiments. For example, the second communication type is not limited to IEEE 802.11 Wi-Fi standards.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A method for enabling a wireless communication between a device and at least one peripheral unit in a wireless docking environment, comprising:
    configuring a main communication circuit arranged in a wireless docking station to communicate with the at least one peripheral unit in accordance with a first wireless communication type;
    pairing the wireless docking station with the at least one peripheral unit using pairing information;
    determining whether the device is docked to the wireless docking station;
    when the device is docked to the wireless docking station, triggering a transfer of the pairing information from the wireless docking station to the device using a second wireless communication type, the pairing information enabling the device to communicate with the at least one peripheral unit directly using the first wireless communication type without going through the wireless docking station.

2. The method of claim 1, further comprising communicating the pairing information to the device according to a third communication type.

3. The method of claim 2, further comprising communicating the pairing information to the device according to the third communication type upon connection of the device to the wireless docking station via the second communication type.

4. The method of claim 2, wherein the third communication type comprises an out-of-band communication type.

5. The method of claim 4, wherein the third communication type uses a Near Field Communication between the wireless docking station and the device.

6. The method of claim 1, further comprising taking over control of the first wireless communication type with the at least one peripheral unit when the device stops communicating directly with the at least one peripheral unit.

7. The method of claim 1, further comprising taking over control of the first wireless communication type with the at least one peripheral unit when the device and the wireless docking station are disconnected.

8. The method of claim 7, further comprising renewing encryption keys between the main communication circuit and the at least one peripheral unit.

9. The method of claim 8, wherein the renewing of the encryption keys further comprises determining the minimum communication signal strength value of the first wireless communication type between the main communication circuit and each peripheral unit (a1-aN), and communicating by using the determined signal strength value appropriate for each peripheral unit.

10. The method of claim 1, wherein the first wireless communication type comprises Bluetooth standards.

11. The method of claim 1, wherein the second communication type comprises Wi-Fi standards or Wi-Fi DIRECT standards.

12. The method of claim 1, further comprising sending an acknowledgement message to the wireless docking station upon receiving the pairing information.

13. The method of claim 12, further comprising stopping to communicate with the at least one peripheral unit upon receiving the acknowledgement message.

14. A pairing system for enabling a wireless communication between a device and at least one peripheral unit in a wireless docking environment, comprising:
    a memory;
    at least one controller coupled to the memory, the controller being configured to:
        configure a main communication circuit to communicate with the at least one peripheral unit in accordance with a first wireless communication type;
        pair a wireless docking station with the at least one peripheral unit using pairing information;
        determine whether the device is docked to the wireless docking station;
        when the device is docked to the wireless docking station, trigger a transfer of the pairing information from the wireless docking station to the device in accordance with a second communication type, the pairing information enabling the device to communicate with the at least one peripheral unit directly using the first wireless communication type without going through the wireless docking station.

15. A wireless docking station, comprising:
    a memory;
    a transceiver;

a controller coupled to the memory, the controller being configured to:

configure a main communication circuit to communicate with the at least one peripheral unit in accordance with a first wireless communication type;

pair a wireless docking station with the at least one peripheral unit using pairing information;

determine whether the device is docked to the wireless docking station;

when the device is docked to the wireless docking station, trigger a transfer of the pairing information from the wireless docking station to the device in accordance with a second communication type, the pairing information enabling the device to communicate with the at least one peripheral unit directly using the first wireless communication type without going through the wireless docking station.

* * * * *